US009815322B2

(12) United States Patent
Senoo

(10) Patent No.: US 9,815,322 B2
(45) Date of Patent: Nov. 14, 2017

(54) BICYCLE HUB AND BICYCLE WHEEL ASSEMBLY

(71) Applicant: SHIMANO INC., Sakai (JP)

(72) Inventor: Norihisa Senoo, Sakai (JP)

(73) Assignee: SHIMANO INC., Sakai (JP)

( * ) Notice: Subject to any disclaimer, the term of this patent is extended or adjusted under 35 U.S.C. 154(b) by 123 days.

(21) Appl. No.: 14/599,555

(22) Filed: Jan. 19, 2015

(65) Prior Publication Data
US 2016/0207354 A1    Jul. 21, 2016

(51) Int. Cl.
| | |
|---|---|
| B60B 1/04 | (2006.01) |
| B60B 27/02 | (2006.01) |
| B60B 1/00 | (2006.01) |
| B60B 27/00 | (2006.01) |
| B60B 1/02 | (2006.01) |

(52) U.S. Cl.
CPC .............. B60B 1/042 (2013.01); B60B 1/003 (2013.01); B60B 1/041 (2013.01); B60B 27/023 (2013.01); *B60B 1/0223* (2013.01); *B60B 27/0052* (2013.01); *B60Y 2200/13* (2013.01)

(58) Field of Classification Search
CPC ........... B60B 1/042; B60B 1/04; B60B 1/041; B60B 1/003; B60B 1/02; B60B 21/062
USPC .................................. 301/59, 55, 57, 61, 104
See application file for complete search history.

(56) References Cited

U.S. PATENT DOCUMENTS

| | | | | |
|---|---|---|---|---|
| 1,975,221 | A * | 10/1934 | Booth ................... | B60B 1/0207 301/55 |
| 5,494,337 | A * | 2/1996 | Behnke ................... | B60B 1/041 301/104 |
| 5,626,401 | A * | 5/1997 | Terry, Sr. ............... | B60B 1/003 301/104 |
| 6,036,279 | A * | 3/2000 | Campagnolo ......... | B60B 1/0261 301/55 |
| 6,354,669 | B1 * | 3/2002 | Tabe ....................... | B60B 1/041 301/110.5 |
| 6,375,273 | B2 * | 4/2002 | Pont ........................ | B60B 1/042 301/110.5 |

(Continued)

FOREIGN PATENT DOCUMENTS

| | | | |
|---|---|---|---|
| DE | 202012101196 U1 * | 4/2012 | ............... B60B 1/04 |
| DE | 102013001450 | 9/2013 | |

(Continued)

*Primary Examiner* — Jason Bellinger
*Assistant Examiner* — Scott A Browne
(74) *Attorney, Agent, or Firm* — Mori & Ward, LLP

(57) ABSTRACT

A bicycle hub comprises a tubular body and a spoke attachment part. The tubular body has a rotational axis. The spoke attachment part includes an attachment opening through which a spoke is to extend. The attachment opening includes a first end opening through which the spoke is to extend, and a second end opening through which the spoke is to extend. The second end opening is provided outward of the first end opening in a radial direction perpendicular to the rotational axis. The second end opening has a first maximum length and a second maximum length. The first maximum length is defined in a circumferential direction defined about the rotational axis. The second maximum length is defined in an axial direction parallel to the rotational axis. The first maximum length is larger than the second maximum length.

33 Claims, 18 Drawing Sheets

(56) References Cited

U.S. PATENT DOCUMENTS

| | | | |
|---|---|---|---|
| 6,409,278 B1 * | 6/2002 | Nakajima | B60B 1/0223 301/110.5 |
| 6,485,108 B1 * | 11/2002 | Tabe | B60B 1/041 301/110.5 |
| 6,511,133 B1 * | 1/2003 | Tabe | B60B 1/041 301/110.5 |
| 6,520,595 B1 * | 2/2003 | Schlanger | B60B 1/003 301/110.5 |
| 6,899,401 B2 * | 5/2005 | Schlanger | B60B 1/003 301/110.5 |
| 7,070,245 B2 * | 7/2006 | Tanaka | B60B 1/041 301/110.5 |
| 7,192,097 B2 * | 3/2007 | Schlanger | B60B 1/0276 301/57 |
| 7,357,459 B2 * | 4/2008 | Schlanger | B60B 1/003 301/59 |
| 7,360,847 B2 | 4/2008 | Okajima et al. | |
| 7,631,944 B2 * | 12/2009 | Meggiolan | B60B 1/0261 301/104 |
| 7,631,945 B2 * | 12/2009 | Addink | B60B 1/0261 301/104 |
| 7,735,936 B2 * | 6/2010 | Passarotto | B60B 1/003 29/894.345 |
| 8,651,583 B2 * | 2/2014 | Kanehisa | B60B 1/003 301/104 |
| 9,290,042 B2 * | 3/2016 | Miyamoto | B60B 1/04 |
| 9,561,685 B2 * | 2/2017 | Koshiyama | B60B 1/042 |
| 9,604,495 B2 * | 3/2017 | Spahr | B60B 27/023 |
| 2001/0005098 A1 * | 6/2001 | Pont | B60B 1/041 301/59 |
| 2003/0173821 A1 * | 9/2003 | Chen | B60B 1/042 301/59 |
| 2004/0262983 A1 | 12/2004 | Tanaka | |
| 2006/0006730 A1 * | 1/2006 | Meggiolan | B60B 1/0261 301/59 |
| 2006/0170277 A1 * | 8/2006 | Passarotto | B60B 1/0261 301/59 |
| 2006/0267399 A1 * | 11/2006 | Okajima | B60B 1/041 301/124.1 |
| 2007/0284934 A1 * | 12/2007 | Chen | B60B 1/041 301/59 |
| 2008/0309152 A1 | 12/2008 | Veux et al. | |
| 2011/0193403 A1 * | 8/2011 | Chen | B60B 1/0223 301/59 |
| 2011/0291466 A1 * | 12/2011 | Kanehisa | B60B 1/003 301/59 |
| 2012/0248854 A1 * | 10/2012 | Spahr | B60B 27/023 301/59 |
| 2013/0207449 A1 | 8/2013 | Koshiyama et al. | |
| 2013/0320749 A1 * | 12/2013 | Connolly | B60B 1/042 301/58 |
| 2014/0175859 A1 * | 6/2014 | Koshiyama | B60B 1/003 301/58 |

FOREIGN PATENT DOCUMENTS

| | | |
|---|---|---|
| EP | 1491361 | 12/2004 |
| JP | 07-25201 | 1/1995 |

* cited by examiner

BICYCLE HUB AND BICYCLE WHEEL ASSEMBLY

BACKGROUND OF THE INVENTION

Field of the Invention

The present invention relates to a bicycle hub and a bicycle wheel assembly.

Discussion of the Background

Bicycling is becoming an increasingly more popular form of recreation as well as a means of transportation. Moreover, bicycling has become a very popular competitive sport for both amateurs and professionals. Whether the bicycle is used for recreation, transportation or competition, the bicycle industry is constantly improving the various components of the bicycle. One bicycle component that has been extensively redesigned is a bicycle wheel assembly including a bicycle hub.

SUMMARY OF THE INVENTION

In accordance with a first aspect of the present invention, a bicycle hub comprises a tubular body and a spoke attachment part. The tubular body has a rotational axis. The spoke attachment part includes an attachment opening through which a spoke is to extend. The attachment opening includes a first end opening through which the spoke is to extend, and a second end opening through which the spoke is to extend. The second end opening is provided outward of the first end opening in a radial direction perpendicular to the rotational axis. The second end opening has a first maximum length and a second maximum length. The first maximum length is defined in a circumferential direction defined about the rotational axis. The second maximum length is defined in an axial direction parallel to the rotational axis. The first maximum length is larger than the second maximum length.

In accordance with a second aspect of the present invention, the bicycle hub according to the first aspect is configured so that the spoke attachment part extends outward from the tubular body in the radial direction.

In accordance with a third aspect of the present invention, the bicycle hub according to the first aspect is configured so that the second end opening is opposite to the first end opening and has a cross-sectional area larger than a cross-sectional area of the first end opening.

In accordance with a fourth aspect of the present invention, the bicycle hub according to the third aspect is configured so that a cross-sectional area of the attachment opening gradually increases from the first end opening to the second end opening.

In accordance with a fifth aspect of the present invention, the bicycle hub according to the first aspect is configured so that the second end opening has an elongated shape extending in the circumferential direction.

In accordance with a sixth aspect of the present invention, the bicycle hub according to the fifth aspect is configured so that the first end opening has an elongated shape extending in the circumferential direction.

In accordance with a seventh aspect of the present invention, the bicycle hub according to the first aspect is configured so that the spoke attachment part includes a cavity in which an end of the spoke is provided in an attachment state where the spoke is attached to the spoke attachment part through the attachment opening.

In accordance with an eighth aspect of the present invention, the bicycle hub according to the seventh aspect is configured so that the first end opening is connected to the cavity. The attachment opening extends outward from the cavity along the radial direction.

In accordance with a ninth aspect of the present invention, the bicycle hub according to the first aspect is configured so that the first end opening has a first center axis. The second end opening has a second center axis. The first center axis is offset from the second center axis in the radial direction.

In accordance with a tenth aspect of the present invention, the bicycle hub according to the first aspect is configured so that the spoke attachment part includes an additional attachment opening through which an additional spoke is to extend. The additional attachment opening includes a third end opening through which the additional spoke is to extend, and a fourth end opening through which the additional spoke is to extend. The fourth end opening has a third maximum length and a fourth maximum length. The third maximum length is defined in the circumferential direction. The fourth maximum length is defined in the axial direction. The third maximum length is larger than the fourth maximum length.

In accordance with an eleventh aspect of the present invention, the bicycle hub according to the tenth aspect is configured so that the fourth end opening is opposite to the third end opening and has a cross-sectional area larger than a cross-sectional area of the third end opening The fourth end opening is provided outward of the third end opening in the radial direction.

In accordance with a twelfth aspect of the present invention, the bicycle hub according to the eleventh aspect is configured so that a cross-sectional area of the additional attachment opening gradually increases from the third end opening to the fourth end opening.

In accordance with a thirteenth aspect of the present invention, the bicycle hub according to the tenth aspect is configured so that the fourth end opening has an elongated shape extending in the circumferential direction.

In accordance with a fourteenth aspect of the present invention, the bicycle hub according to the thirteenth aspect is configured so that the third end opening has an elongated shape extending in the circumferential direction.

In accordance with a fifteenth aspect of the present invention, the bicycle hub according to the tenth aspect is configured so that the spoke attachment part includes a cavity in which respective ends of the spoke and the additional spokes are provided in an attachment state where the spoke and the additional spoke are attached to the spoke attachment part through the attachment opening and the additional attachment opening.

In accordance with a sixteenth aspect of the present invention, the bicycle hub according to the fifteenth aspect is configured so that the first end opening is connected to the cavity. The attachment opening extends outward from the cavity along the radial direction. The third end opening is connected to the cavity. The additional attachment opening extends outward from the cavity along the radial direction.

In accordance with a seventeenth aspect of the present invention, the bicycle hub according to the tenth aspect is configured so that a first distance between the first end opening and the third end opening is shorter than a second distance between the second end opening and the fourth end opening in the circumferential direction.

In accordance with an eighteenth aspect of the present invention, the bicycle hub according to the tenth aspect is configured so that the attachment opening and the additional attachment opening are arranged in the circumferential direction.

In accordance with a nineteenth aspect of the present invention, the bicycle hub according to the eighteenth aspect is configured so that the additional attachment opening is disposed at a position equal to a position of the attachment opening in the axial direction.

In accordance with a twentieth aspect of the present invention, the bicycle hub according to the first aspect is configured so that the spoke attachment part includes attachment portions spaced apart from each other in the circumferential direction. The attachment opening is provided in each of the attachment portions.

In accordance with a twenty-first aspect of the present invention, the bicycle hub according to the first aspect further comprises an additional spoke attachment part. The additional spoke attachment part includes a first through-hole through which a first spoke is to extend, and a second through-hole through which a second spoke is to extend.

In accordance with a twenty-second aspect of the present invention, the bicycle hub according to the twenty-first aspect is configured so that the additional spoke attachment part extends outward from the tubular body in the radial direction.

In accordance with a twenty-third aspect of the present invention, the bicycle hub according to the twenty-second aspect is configured so that the tubular body includes a first axial end and a second axial end opposite to the first axial end in the axial direction. The spoke attachment part is provided at the first axial end. The additional spoke attachment part are provided at the second axial end.

In accordance with a twenty-fourth aspect of the present invention, the bicycle hub according to the twenty-third aspect is configured so that the first through-hole and the second through-hole are arranged in the axial direction.

In accordance with a twenty-fifth aspect of the present invention, the bicycle hub according to the first aspect further comprises a rotor attachment part to which a disc brake rotor is to be attached.

In accordance with a twenty-sixth aspect of the present invention, a bicycle wheel assembly comprises the bicycle hub according to the twenty-fifth aspect, a spoke attached to the spoke attachment part via the attachment opening, and a disc brake rotor attached to the rotor attachment part.

In accordance with a twenty-seventh aspect of the present invention, a bicycle hub comprises a tubular body and a spoke attachment part. The tubular body has a rotational axis. The spoke attachment part includes an attachment opening through which a spoke is to extend. The attachment opening includes a first end opening through which the spoke is to extend, and a second end opening through which the spoke is to extend. The second end opening is opposite to the first end opening. The second end opening is provided outward of the first end opening in a radial direction perpendicular to the rotational axis. The second end opening is configured such that the spoke is pivotable relative to the spoke attachment part in a circumferential direction defined about the rotational axis in a state where the spoke extends through the first end opening and the second end opening.

In accordance with a twenty-eighth aspect of the present invention, the bicycle hub according to the twenty-seventh aspect is configured so that the second end opening has a first maximum length and a second maximum length. The first maximum length is defined in a circumferential direction defined about the rotational axis. The second maximum length is defined in an axial direction parallel to the rotational axis. The first maximum length is larger than the second maximum length.

In accordance with a twenty-ninth aspect of the present invention, the bicycle hub according to the twenty-seventh aspect is configured so that the first end opening has a first center axis. The second end opening has a second center axis. The first center axis is offset from the second center axis in the radial direction.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DESCRIPTION OF THE EMBODIMENTS

Figure 1:
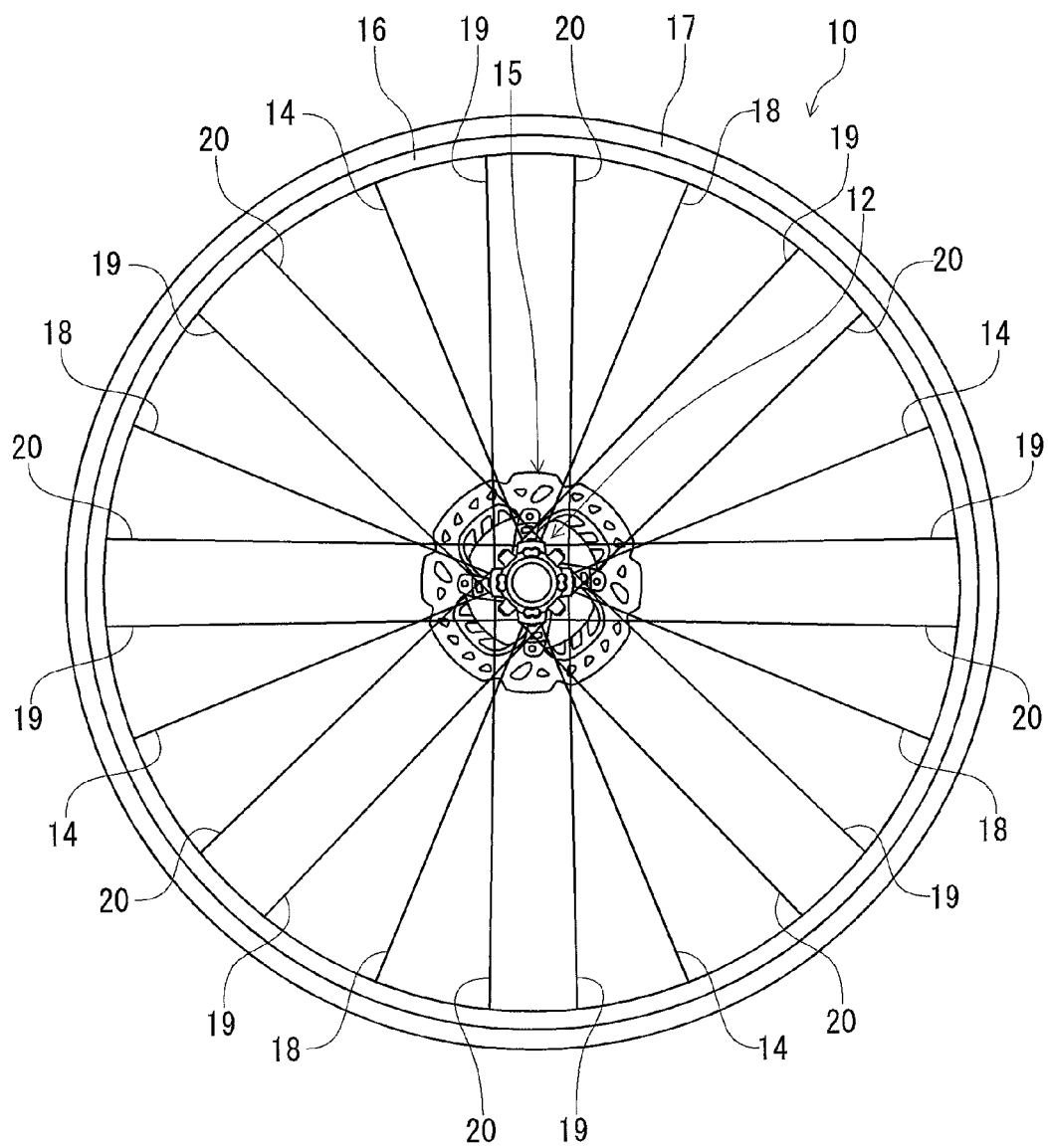
FIG. 1 is a right side elevational view of a bicycle wheel assembly in accordance with a first embodiment.

The embodiments will now be described with reference to the accompanying drawings, wherein like reference numerals designate corresponding or identical elements throughout the various drawings.

First Embodiment

Referring initially to FIG. 1, a bicycle wheel assembly 10 in accordance with a first embodiment comprises a bicycle hub 12, a spoke 14, and a disc brake rotor 15. In the illustrated embodiment, the bicycle wheel assembly 10 comprises spokes 14. The bicycle wheel assembly 10 further comprises a rim 16, a tire 17, additional spokes 18, first spokes 19, and second spokes 20. The rim 16 is coupled to the bicycle hub 12 via the spokes 14, the additional spokes 18, the first spokes 19, and the second spokes 20. The tire 17 is attached to the rim 16.

As seen in FIG. 1, the spokes 14 and the additional spokes 18 provide a radial spoke pattern on a right side of the bicycle wheel assembly 10. The first spokes 19 and the second spokes 20 provide a tangent spoke pattern on a left side of the bicycle wheel assembly 10. However, the spoke pattern of the bicycle wheel assembly 10 are not limited to the illustrated embodiment.

In the present application, the following directional terms "front", "rear", "forward", "rearward", "left", "right", "transverse", "upward" and "downward" as well as any other similar directional terms refer to those directions which are determined on the basis of a user (e.g., a rider) who sits on a saddle (not shown) of a bicycle with facing a handlebar (not shown). Accordingly, these terms, as utilized to describe the bicycle wheel assembly 10 and the bicycle hub 12, should be interpreted relative to the bicycle equipped with the bicycle wheel assembly 10 as used in an upright riding position on a horizontal surface.

Figure 2:
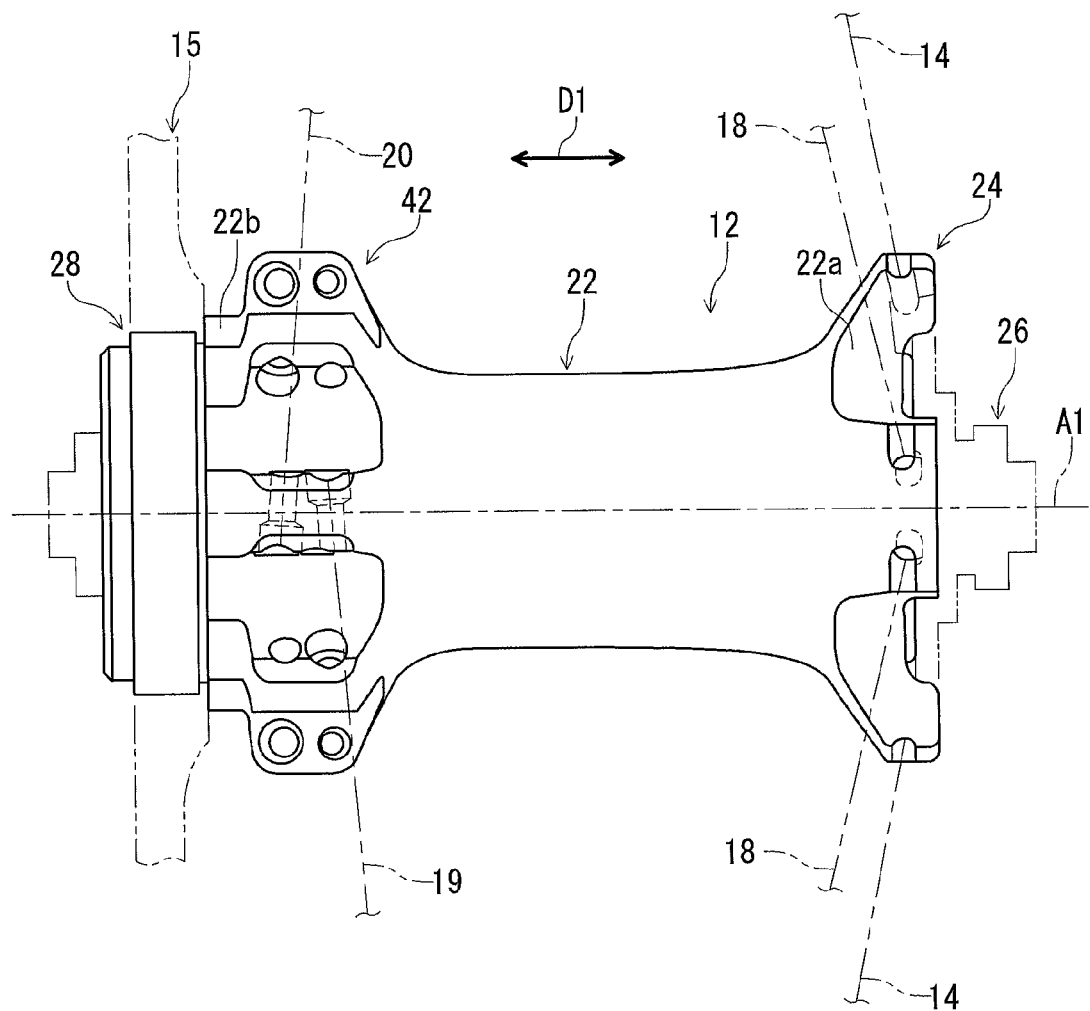
FIG. 2 is a rear view of a bicycle hub of the bicycle wheel assembly illustrated in FIG. 1.

As seen in FIG. 2, the bicycle hub 12 in accordance with the first embodiment comprises a tubular body 22 and a spoke attachment part 24. The tubular body 22 has a rotational axis A1. The tubular body 22 is configured to be rotatably mounted on a hub axle 26 about the rotational axis A1 via bearings (not shown). The tubular body 22 extends in an axial direction D1 parallel to the rotational axis A1.

In the illustrated embodiment, the bicycle hub 12 further comprises a rotor attachment part 28 to which the disc brake rotor 15 is to be attached. The rotor attachment part 28 extends from the tubular body 22 in the axial direction D1.

Figure 3:
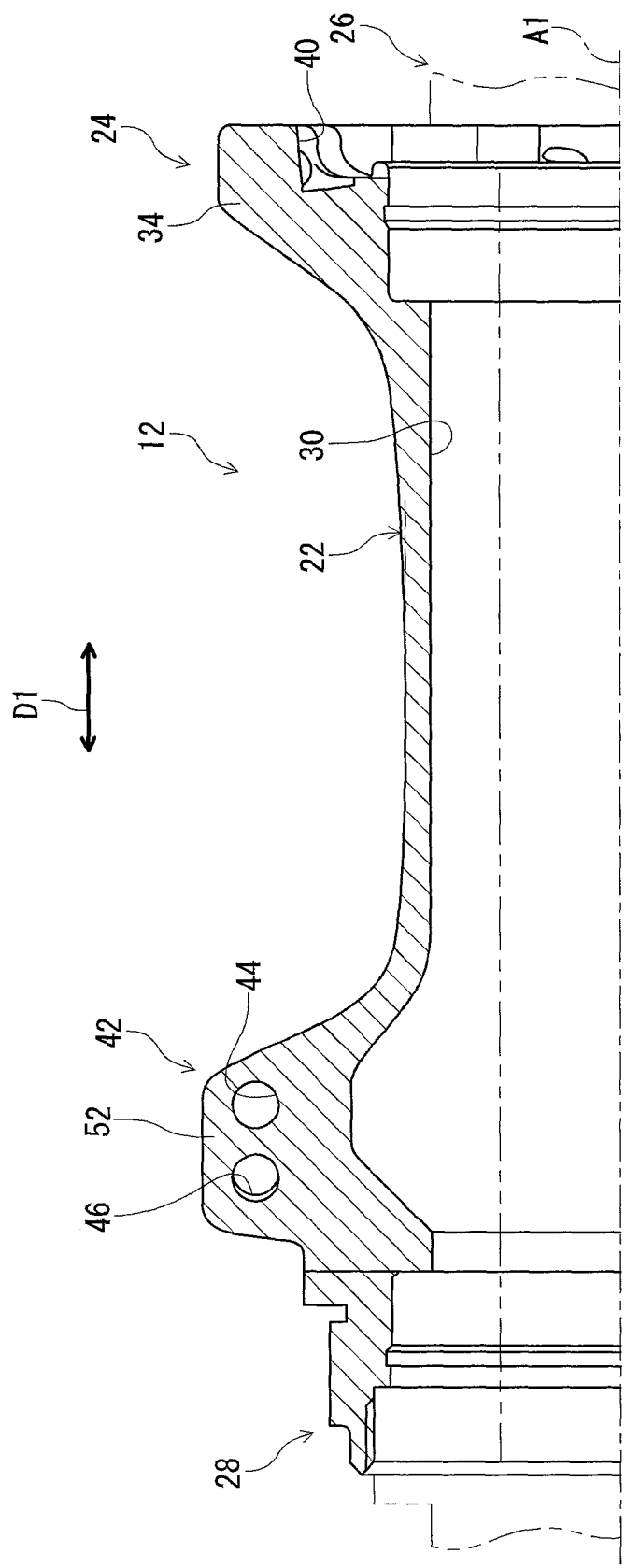
FIG. 3 is a cross-sectional view of the bicycle hub illustrated in FIG. 2.

As seen in FIG. 3, the tubular body 22 includes a hub opening 30 through which the hub axle 26 is to extend. The hub opening 30 extends in the axial direction D1. The spoke attachment part 24 extends outward from the tubular body 22 in a radial direction perpendicular to the rotational axis A1.

Figure 4:
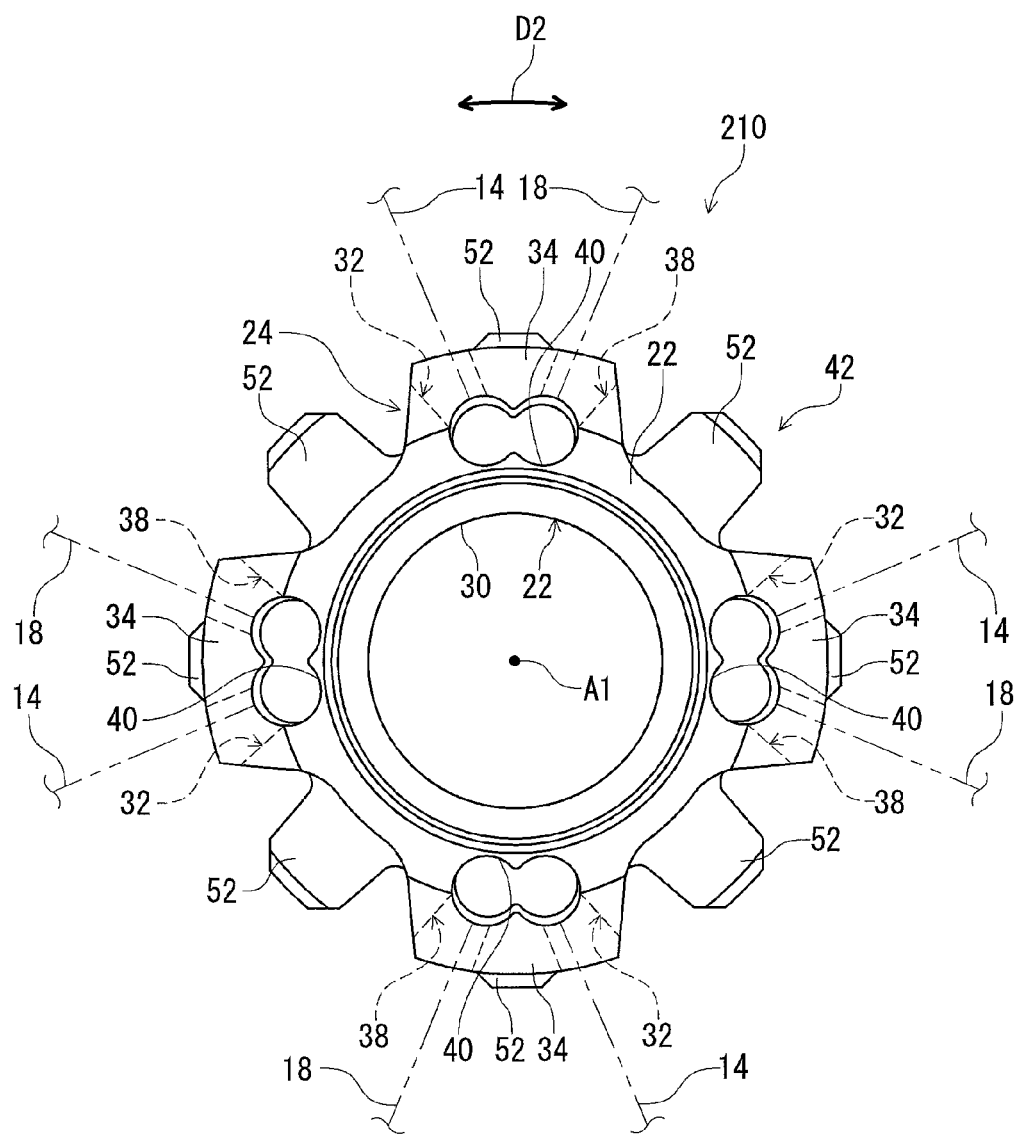
FIG. 4 is a right elevational view of the bicycle hub illustrated in FIG. 2.
Figure 5:
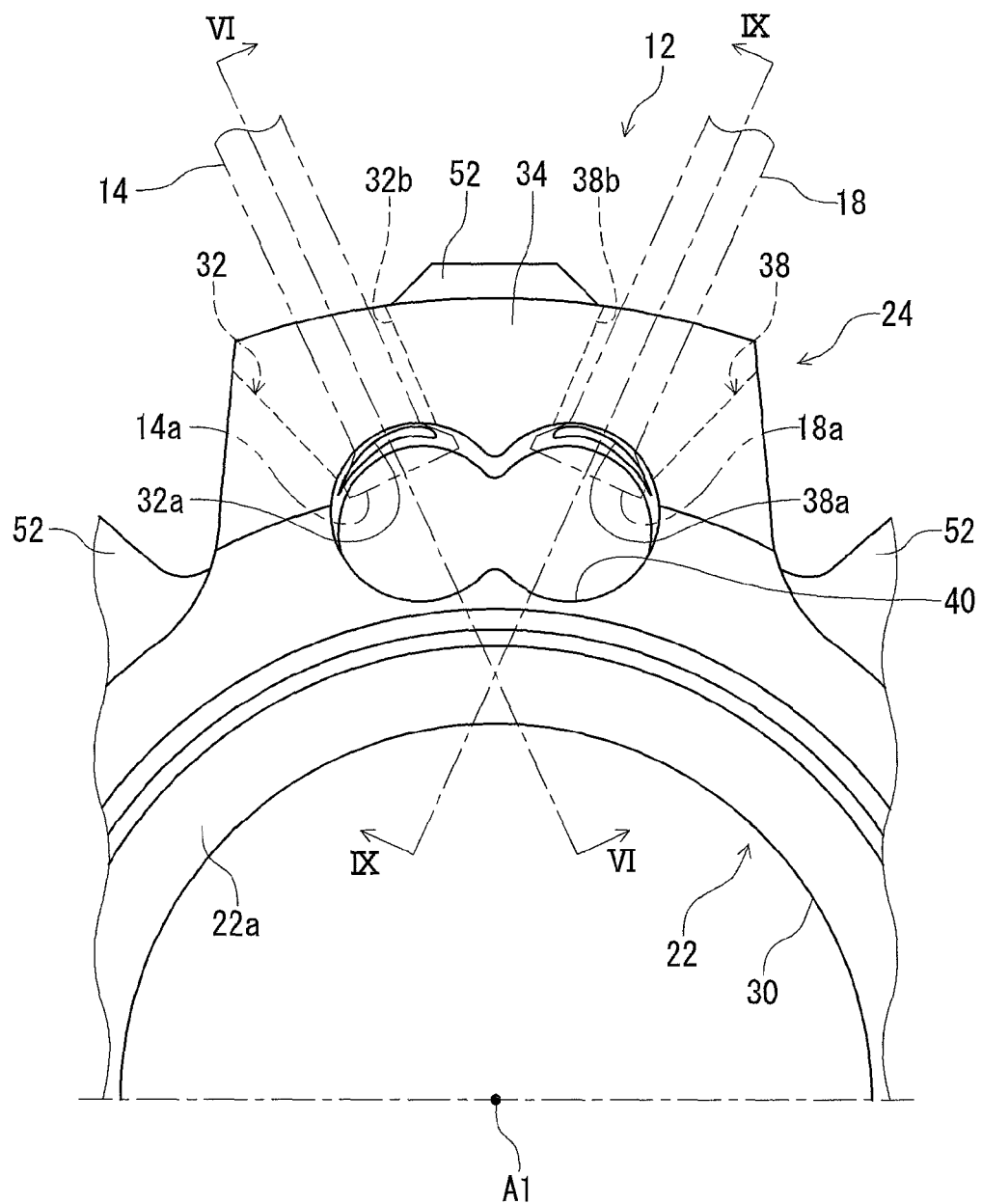
FIG. 5 is a partial enlarged right elevational view of the bicycle hub illustrated in FIG. 2.

As seen in FIGS. 4 and 5, the spoke attachment part 24 includes an attachment opening 32 through which the spoke 14 is to extend. The spoke 14 is attached to the spoke attachment part 24 via the attachment opening 32. In the illustrated embodiment, as seen in FIG. 4, the spoke attachment part 24 includes attachment portions 34 spaced apart from each other in a circumferential direction D2 defined about the rotational axis A1. The attachment opening 32 is provided in each of the attachment portions 34. Namely, the spoke attachment part 24 includes the attachment openings 32 through which the spokes 14 respectively are to extend. The attachment portions 34 are equally spaced apart from each other in the circumferential direction D2. The attachment portions 34 protrude radially outward from the tubular body 22.

While the attachment portions 34 are separate portions from each other in the illustrated embodiment, the spoke attachment part 24 can be a single unitary part if needed and/or desired. For example, the spoke attachment part 24 can have an annular shape.

As seen in FIGS. 4 and 5, the spoke attachment part 24 includes an additional attachment opening 38 through which the additional spoke 18 is to extend. In the illustrated embodiment, the additional attachment opening 38 is provided in each of the attachment portions 34. Namely, the spoke attachment part 24 includes the additional attachment openings 38 through which the additional spokes 18 respectively are to extend. The attachment openings 32 and the additional attachment openings 38 are alternately arranged in the circumferential direction D2.

Figure 6:
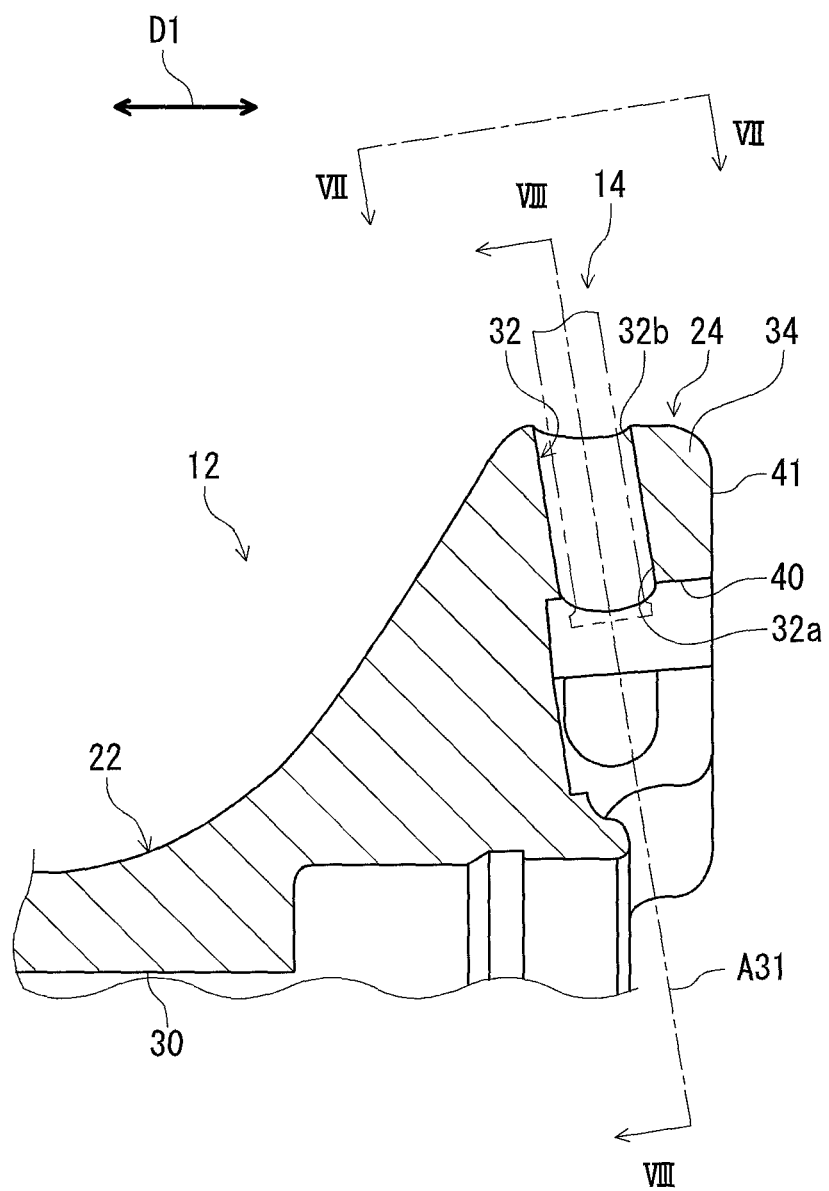
FIG. 6 is a cross-sectional view of the bicycle hub taken along line VI-VI of FIG. 5.

As seen in FIGS. 5 and 6, the attachment opening 32 includes a first end opening 32a through which the spoke 14 is to extend, and a second end opening 32b through which the spoke 14 is to extend. The second end opening 32b is opposite to the first end opening 32a. The second end opening 32b is provided outward of the first end opening 32a in the radial direction.

Figure 7:
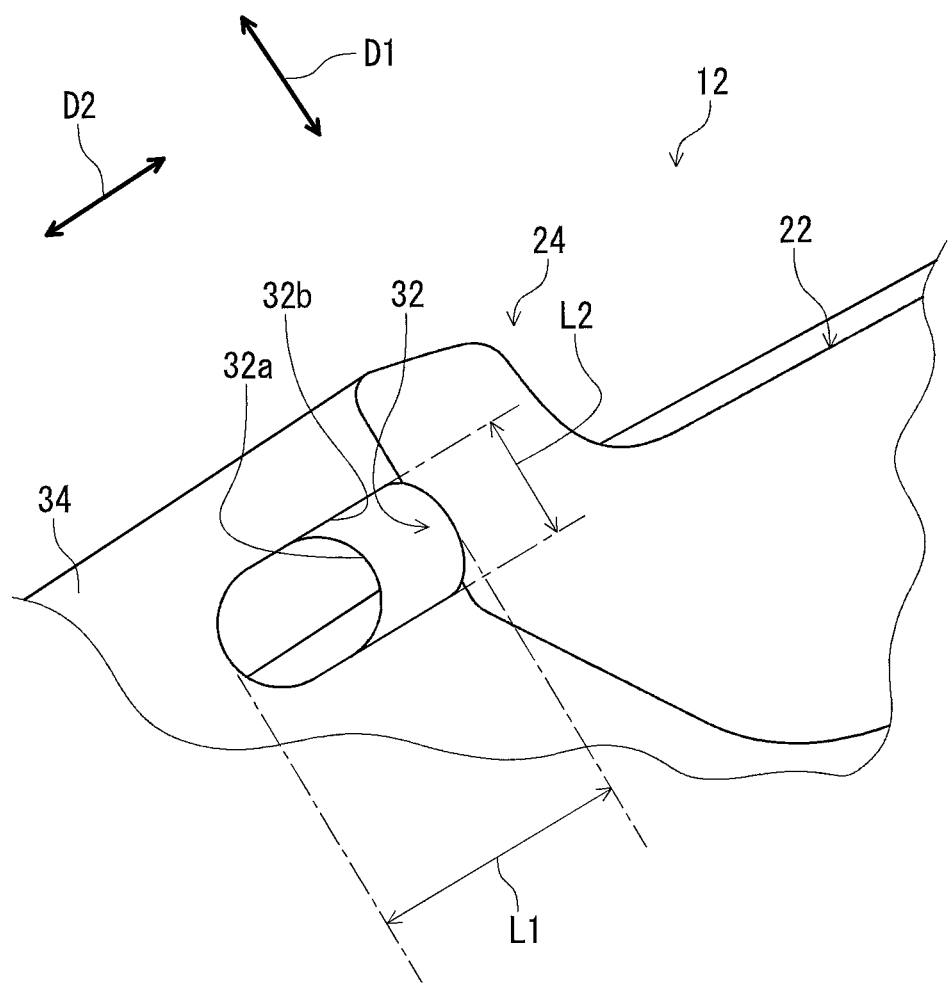
FIG. 7 is a top plan view of the bicycle hub viewed from line VII-VII of FIG. 6.

As seen in FIG. 7, the second end opening 32b has a first maximum length L1 and a second maximum length L2. The first maximum length L1 is defined in the circumferential direction D2 defined about the rotational axis A1 (FIG. 2). The second maximum length L2 is defined in the axial direction D1 parallel to the rotational axis A1 (FIG. 2). The first maximum length L1 is larger than the second maximum length L2. The second end opening 32b has an elongated shape extending in the circumferential direction D2. The first end opening 32a has an elongated shape extending in the circumferential direction D2.

Figure 8:
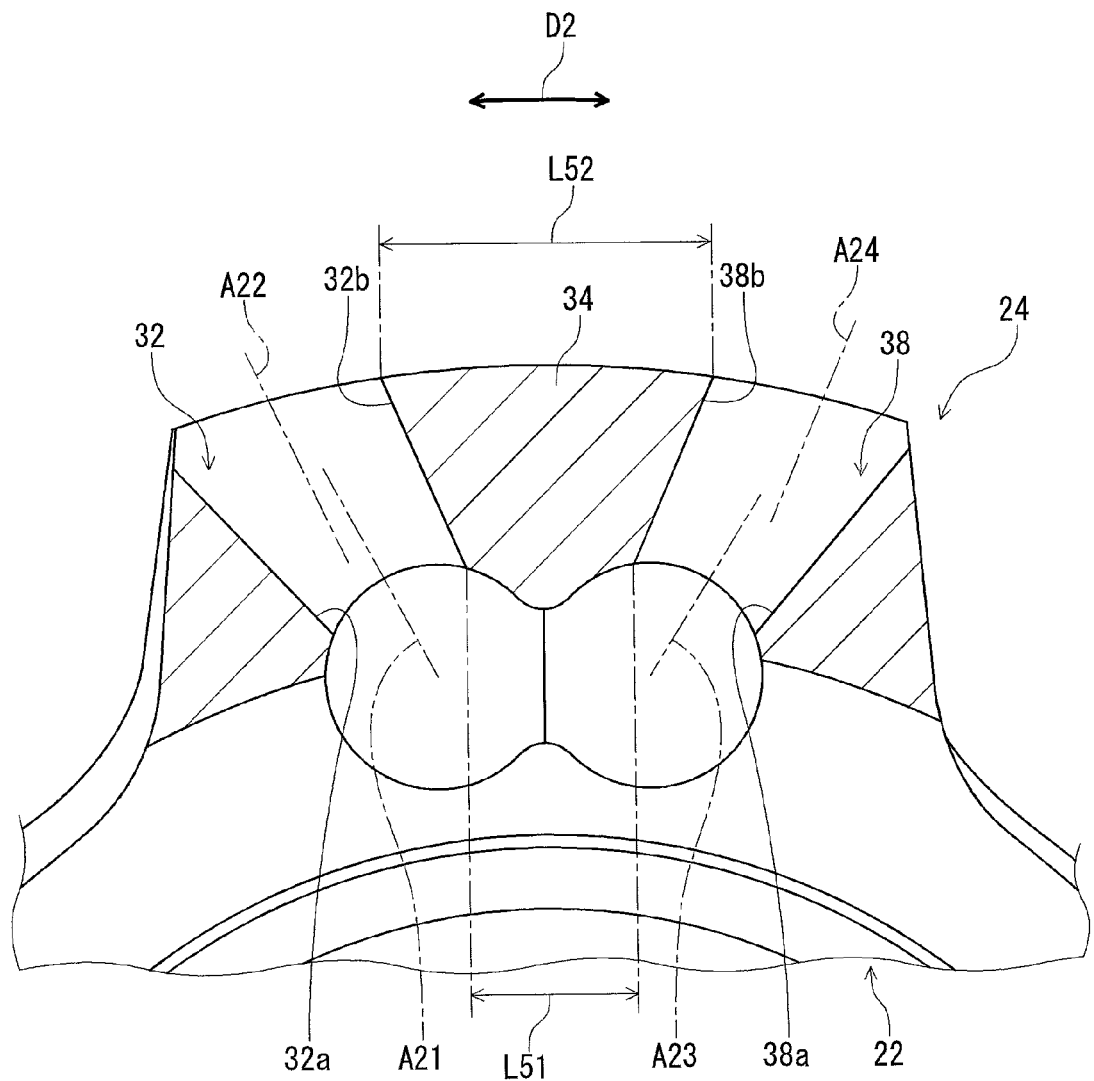
FIG. 8 is a cross-sectional view of the bicycle hub taken along line VIII-VIII of FIG. 6.

As seen in FIGS. 7 and 8, the second end opening 32b has a cross-sectional area larger than a cross-sectional area of the first end opening 32a. A cross-sectional area of the attachment opening 32 gradually increases from the first end opening 32a to the second end opening 32b. As seen in FIG. 8, the first end opening 32a has a first center axis A21. The second end opening 32b has a second center axis A22. The first center axis A21 is offset from the second center axis A22 in the radial direction. The first center axis A21 is offset from the second center axis A22 in the circumferential direction D2. The shape of the attachment opening 32 is not limited to the illustrated embodiment. The attachment opening 32 can have other shapes if needed and/or desired.

Figure 9:
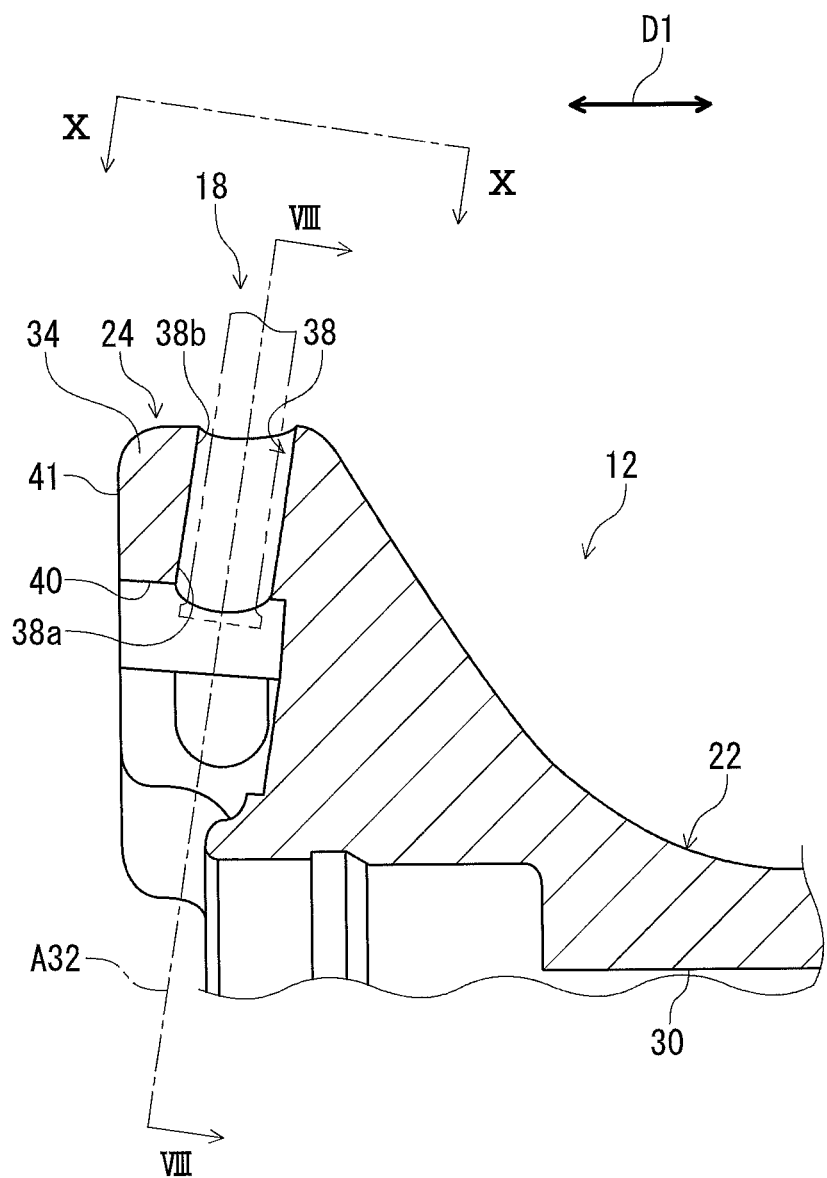
FIG. 9 is a cross-sectional view of the bicycle hub taken along line IX-IX of FIG. 5.

As seen in FIGS. 5 and 9, the additional attachment opening 38 includes a third end opening 38a through which the additional spoke 18 is to extend, and a fourth end opening 38b through which the additional spoke 18 is to extend. The fourth end opening 3 8b is opposite to the third end opening 38a. The fourth end opening 38b is provided outward of the third end opening 38a in the radial direction.

Figure 10:
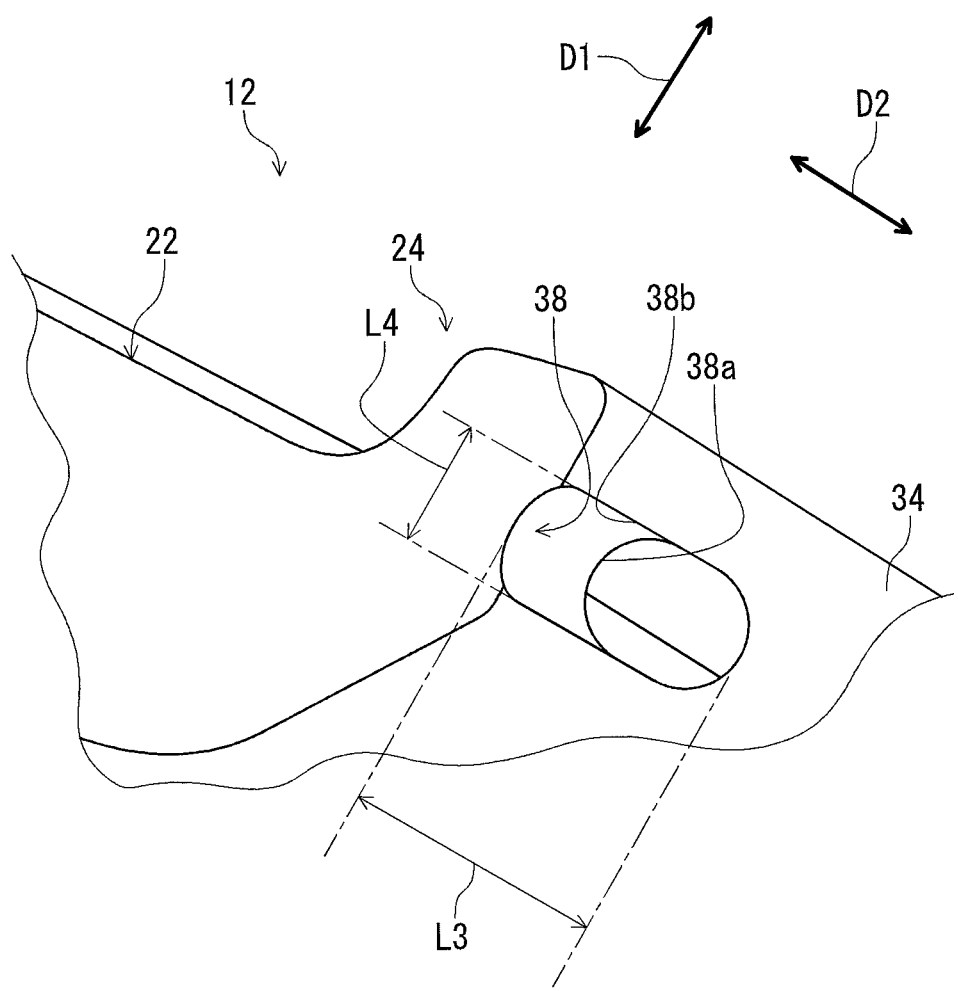
FIG. 10 is a top plan view of the bicycle hub viewed from line X-X of FIG. 9.

As seen in FIG. 10, the fourth end opening 38b has a third maximum length L3 and a fourth maximum length L4. The third maximum length L3 is defined in the circumferential direction D2. The fourth maximum length L4 is defined in the axial direction D1. The third maximum length L3 is larger than the fourth maximum length L4. The fourth end opening 38b has an elongated shape extending in the circumferential direction D2. The third end opening 38a has an elongated shape extending in the circumferential direction D2.

As seen in FIGS. 8 and 10, the fourth end opening 38b has a cross-sectional area larger than a cross-sectional area of the third end opening 38a. A cross-sectional area of the additional attachment opening 38 gradually increases from the third end opening 38a to the fourth end opening 38b. As seen in FIG. 8, the third end opening 38a has a third center axis A23. The fourth end opening 38b has a fourth center axis A24. The third center axis A23 is offset from the fourth center axis A24 in the radial direction. The third center axis A23 is offset from the fourth center axis A24 in the circumferential direction D2. The shape of the additional attachment opening 38 is not limited to the illustrated embodiment. The additional attachment opening 38 can have other shapes if needed and/or desired.

As seen in FIG. 8, the attachment opening 32 and the additional attachment opening 38 are arranged in the circumferential direction D2. A first distance L51 between the first end opening 32a and the third end opening 38a is shorter than a second distance L52 between the second end opening 32b and the fourth end opening 38b in the circumferential direction D2. The first distance L51 and the second distance L52 are defined with respect to each of the attachment portions 34 of the spoke attachment part 24.

As seen in FIG. 5, the spoke attachment part 24 includes a cavity 40 in which an end 14a of the spoke 14 is provided in an attachment state where the spoke 14 is attached to the spoke attachment part 24 through the attachment opening 32. The first end opening 32a is connected to the cavity 40. The attachment opening 32 extends outward from the cavity 40 along the radial direction. In the illustrated embodiment, the cavity 40 is provided in each of the attachment portions 34. Namely, the spoke attachment part 24 includes the cavities 40 in which the ends 14a of the spokes 14 are respectively provided in the attachment state where the spokes 14 are attached to the spoke attachment part 24 through the attachment openings 32.

In the illustrated embodiment, respective ends 14a and 18a of the spoke 14 and the additional spokes 18 are provided in the cavity 40 in the attachment state where the spoke 14 and the additional spoke 18 are attached to the spoke attachment part 24 through the attachment opening 32 and the additional attachment opening 38. The third end opening 38a is connected to the cavity 40. The additional attachment opening 38 extends outward from the cavity 40 along the radial direction.

Figure 11:
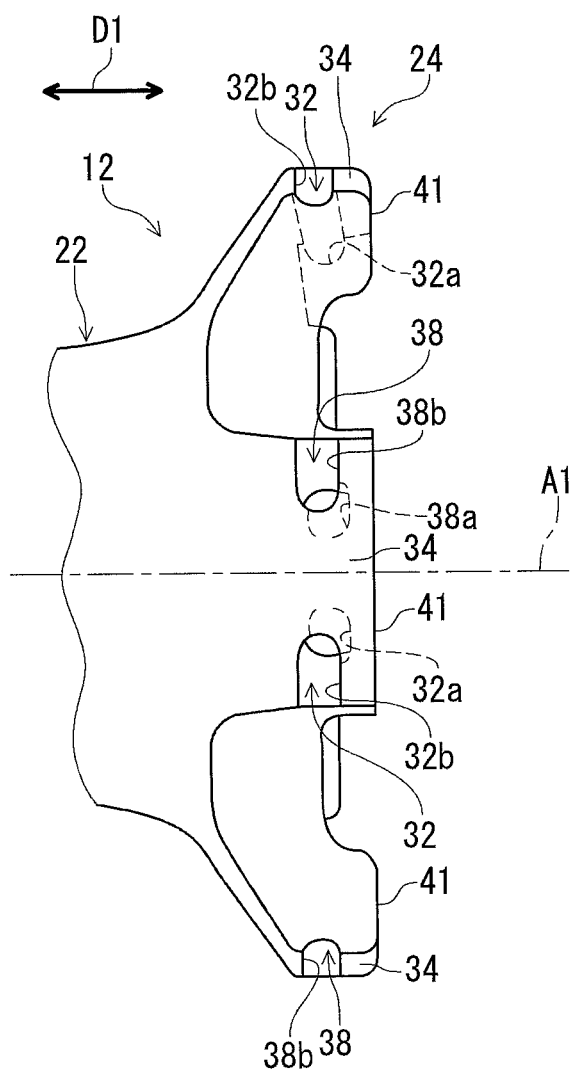
FIG. 11 is a partial enlarged rear view of the bicycle hub illustrated in FIG. 2.

As seen in FIG. 11, the additional attachment opening 38 is disposed at a position equal to a position of the attachment opening 32 in the axial direction D1. The second end opening 32b is offset from the first end opening 32a in the axial direction D1. The fourth end opening 38b is offset from the third end opening 38a in the axial direction D1. Each of the attachment portions 34 includes an end surface 41 facing in the axial direction D1. In the illustrated embodiment, the first end opening 32a is closer to the second end opening 32b in the axial direction D1. The third end opening 38a is closer to the fourth end opening 38b in the axial direction D1.

As seen in FIG. 6, the attachment opening 32 defines a center axis A31. The center axis A31 of the attachment opening 32 is inclined relative to the axial direction D1. As seen in FIG. 9, the additional attachment opening 38 defines a center axis A32. The center axis A32 of the additional attachment opening 38 is inclined relative to the axial direction D1.

As seen in FIG. 2, the bicycle hub 12 further comprises an additional spoke attachment part 42. The tubular body 22 includes a first axial end 22a and a second axial end 22b opposite to the first axial end 22a in the axial direction D1. The spoke attachment part 24 is provided at the first axial end 22a. The additional spoke attachment part 42 are provided at the second axial end 22b.

Figure 12:
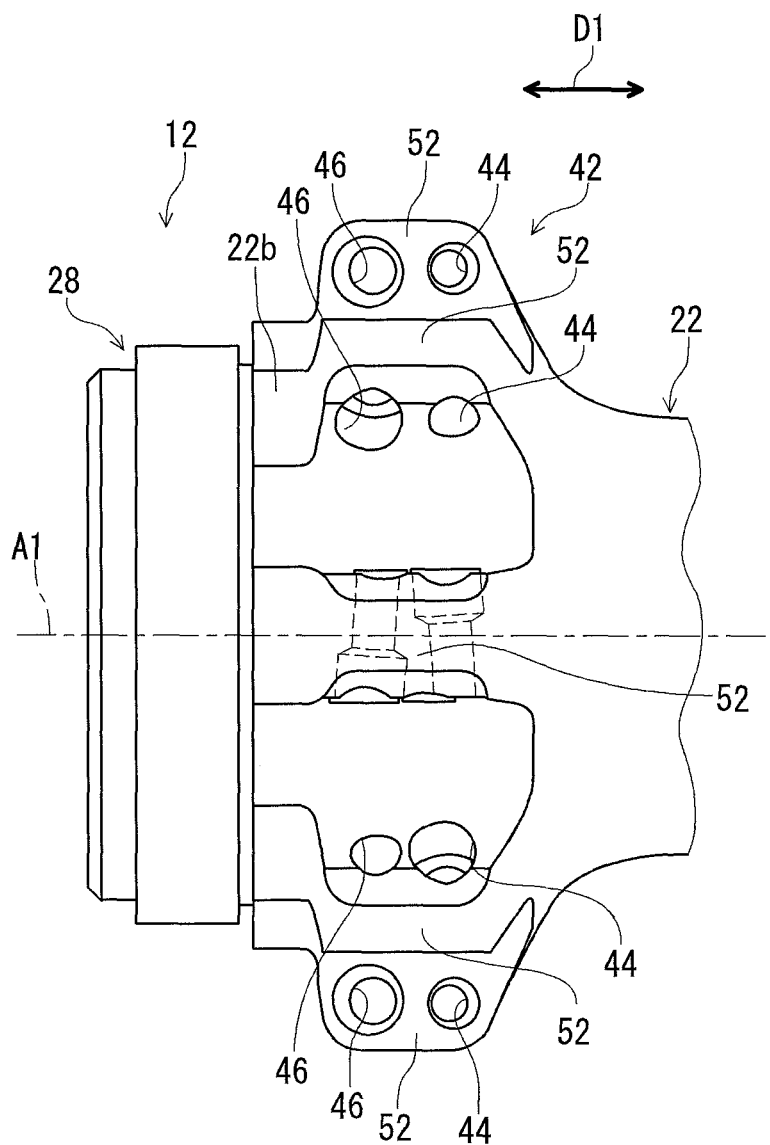
FIG. 12 is a partial enlarged rear view of the bicycle hub illustrated in FIG. 2.

As seen in FIG. 12, the additional spoke attachment part 42 includes a first through-hole 44 through which the first spoke 19 (FIG. 1) is to extend, and a second through-hole 46 through which the second spoke 20 (FIG. 1) is to extend. The additional spoke attachment part 42 extends outward from the tubular body 22 in the radial direction. The first through-hole 44 and the second through-hole 46 are arranged in the axial direction D1.

Figure 13:
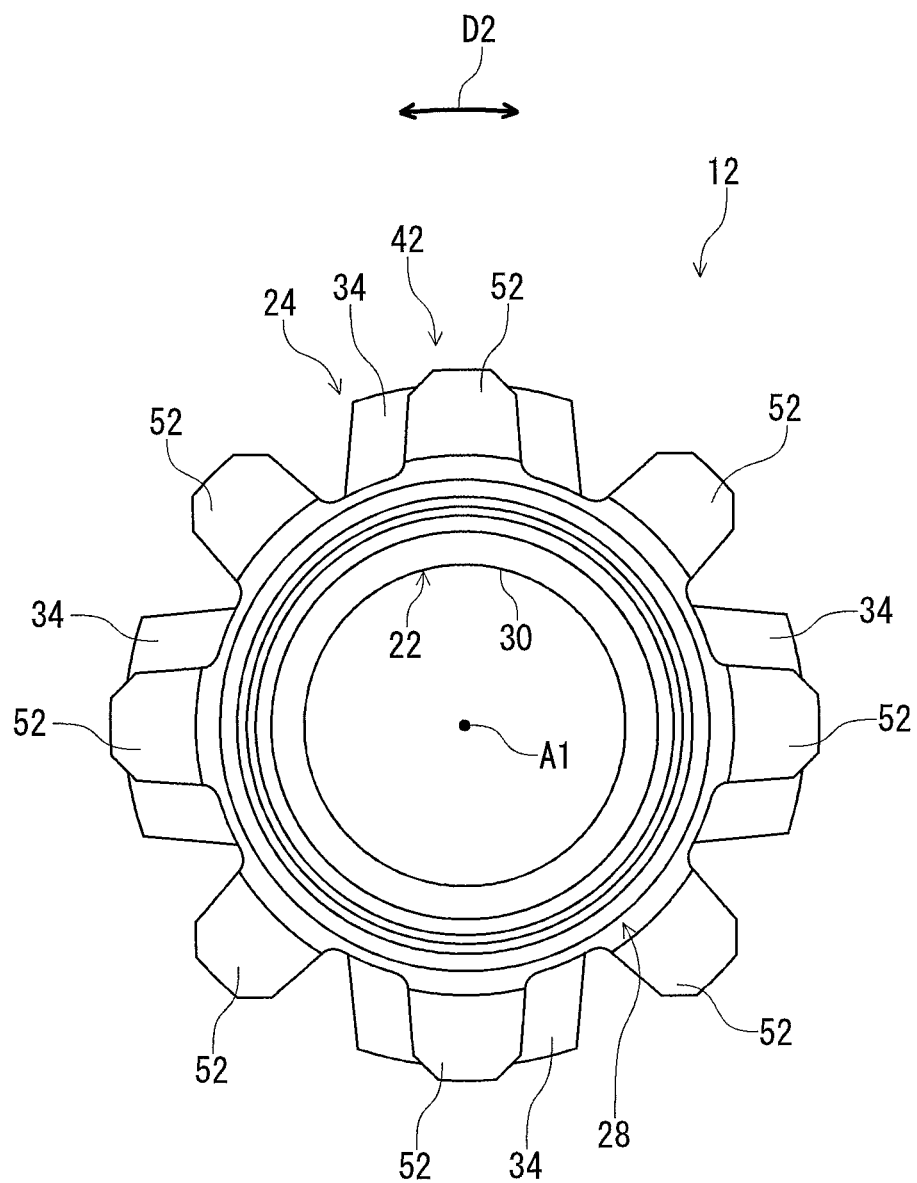
FIG. 13 is a left elevational view of the bicycle hub illustrated in FIG. 2.

In the illustrated embodiment, as seen in FIG. 13, the additional spoke attachment part 42 includes additional attachment portions 52 spaced apart from each other in the circumferential direction D2. In the illustrated embodiment, the additional attachment portions 52 are equally spaced apart from each other in the circumferential direction D2.

As seen in FIG. 12, the first through-hole 44 and the second through-hole 46 are provided in each of the additional attachment portions 52. Namely, the additional spoke attachment part 42 includes the first through-holes 44 and the second through-holes 46.

Figure 14:
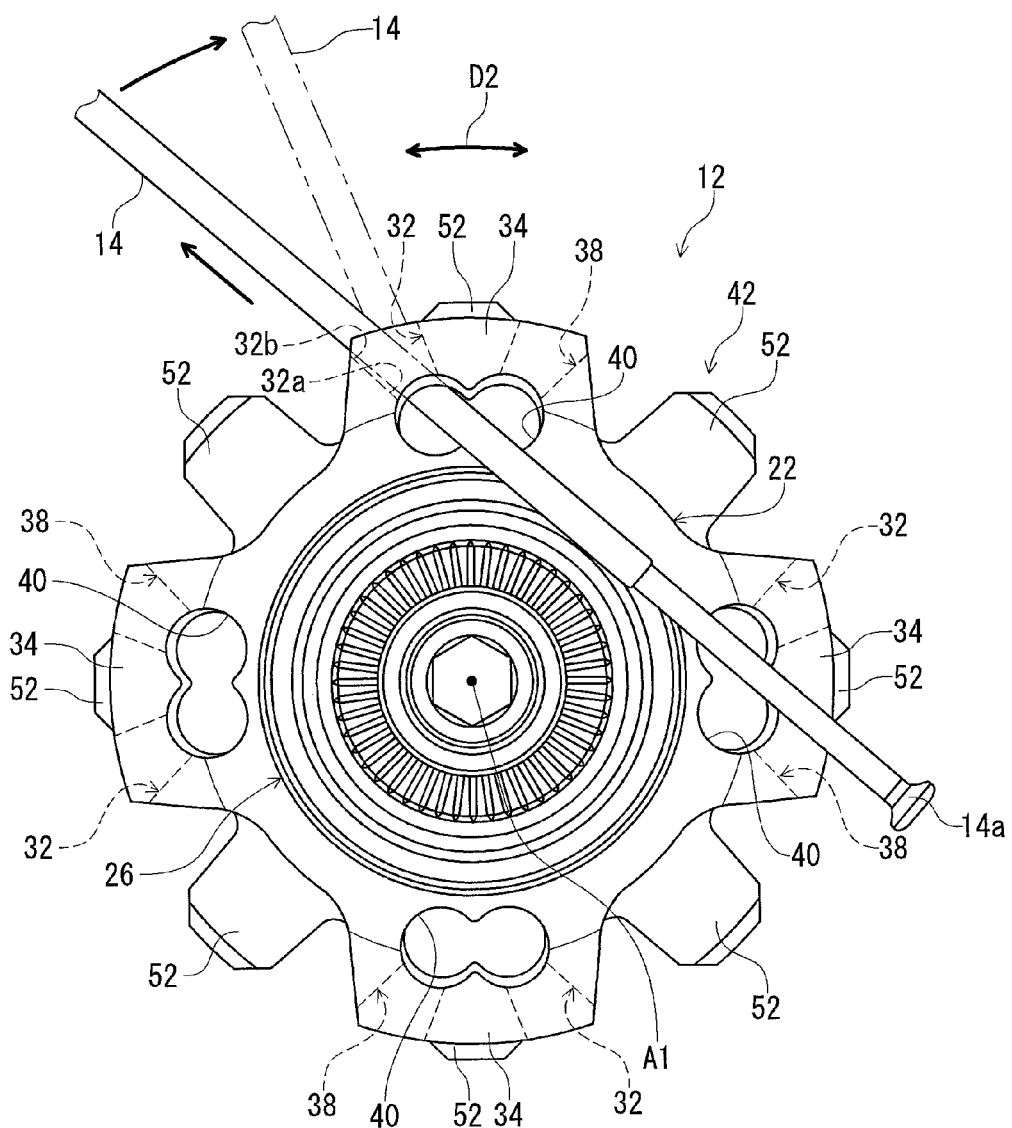
FIG. 14 is a right elevational view of the bicycle hub for explaining attachment of a spoke to the bicycle hub illustrated in FIG. 2.

As seen in FIG. 14, the second end opening 32b is configured such that the spoke 14 is pivotable relative to the spoke attachment part 24 in the circumferential direction D2 defined about the rotational axis A1 in a state where the spoke 14 extends through the first end opening 32a and the second end opening 32b.

More specifically, the spoke 14 is inserted into the attachment opening 32 from the first end opening 32a when the spoke 14 is attached to the attachment portion 34 of the spoke attachment part 24. In this state, it is possible to avoid interference between the spoke 14 and the hub axle 26. When the end 14a of the spoke 14 comes close to the attachment opening 32, the spoke 14 is pivotable relative to the spoke attachment part 24 within a pivotal range defined by the attachment opening 32. In the illustrated embodiment, the spoke 14 is pivoted relative to the spoke attachment part 24 so that the spoke 14 is positioned along the radial direction perpendicular to the rotational axis A1. Preferably, the spoke 14 is pivoted relative to the spoke attachment part 24 in a state where the end 14a of the spoke 14 is positioned in the cavity 40.

Figure 15:
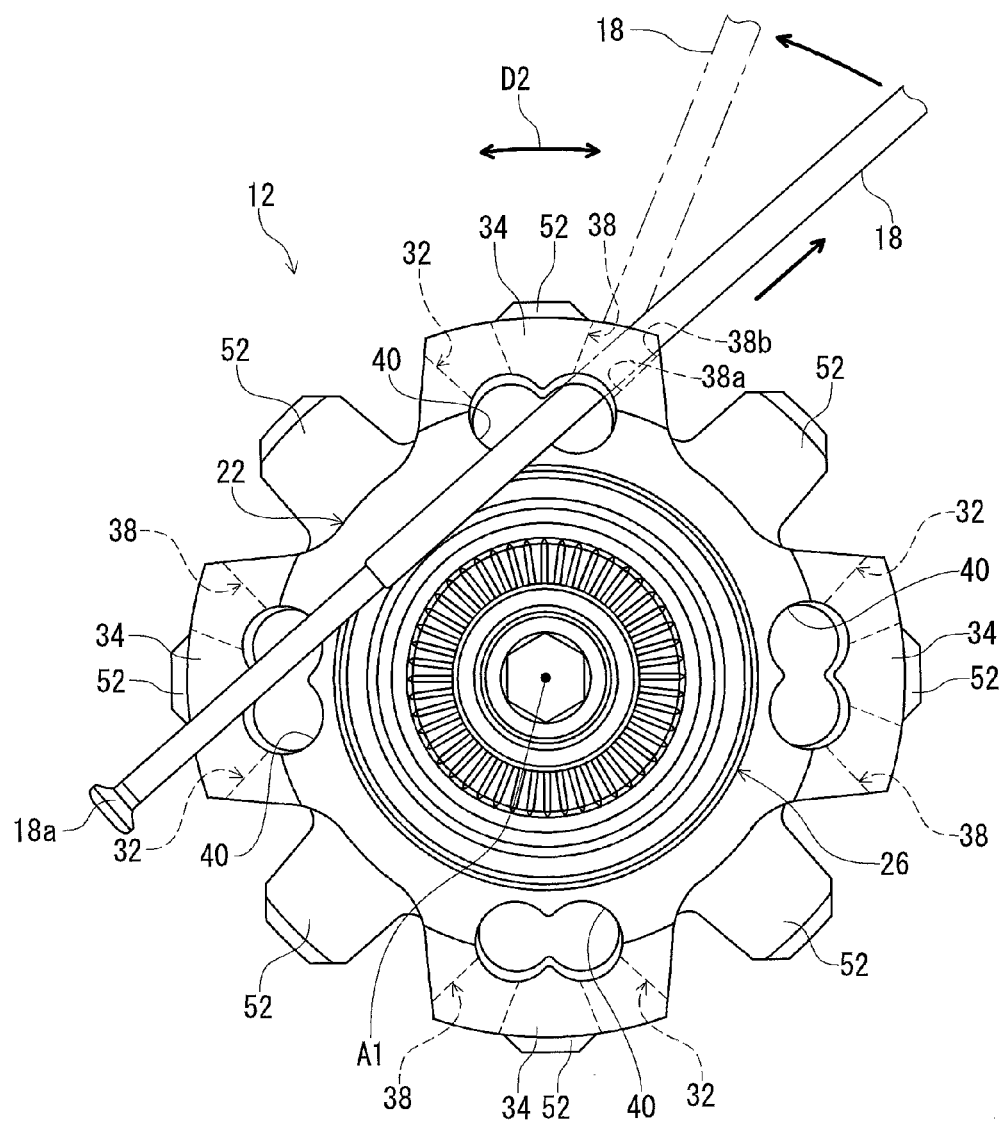
FIG. 15 is a right elevational view of the bicycle hub for explaining attachment of an additional spoke to the bicycle hub illustrated in FIG. 2.

Similarly, as seen in FIG. 15, the fourth end opening 38b is configured such that the additional spoke 18 is pivotable in the circumferential direction D2 defined about the rotational axis A1 in a state where the additional spoke 18 extends through the third end opening 38a and the fourth end opening 38b. In this state, it is possible to avoid interference between the additional spoke 18 and the hub axle 26. When the end 18a of the additional spoke 18 comes close to the additional attachment opening 38, the additional spoke 18 is pivotable relative to the spoke attachment part 24 within a pivotal range defined by the additional attachment opening 38. In the illustrated embodiment, the additional spoke 18 is pivoted relative to the spoke attachment part 24 so that the additional spoke 18 is positioned along the radial direction perpendicular to the rotational axis A1. Preferably, the additional spoke 18 is pivoted relative to the spoke attachment part 24 in a state where the end 18a of the additional spoke 18 is positioned in the cavity 40.

With the bicycle hub 12, as seen in FIG. 7, the second end opening 32b has the first maximum length L1 defined in the circumferential direction D2, and the second maximum length L2 defined in the axial direction D1. The first maximum length L1 is larger than the second maximum length L2. This enlarges a movable range of the spoke 14 when the spoke 14 is attached to the spoke attachment part 24 via the attachment opening 32, allowing the spoke 14 to be attached to the spoke attachment part 24 without removing the hub axle 26 from the bicycle hub 12. Accordingly, it is possible to improve the maintenance of the bicycle wheel assembly 10. Since the additional attachment opening 38 has substantially the same construction as that of the attachment opening 32, the additional attachment opening 38 can provide substantially the same advantageous effect.

With the bicycle hub 12, as seen in FIG. 14, the second end opening 32b is configured such that the spoke 14 is pivotable relative to the spoke attachment part 24 in the circumferential direction D2 defined about the rotational axis A1 in the state where the spoke 14 extends through the first end opening 32a and the second end opening 32b. This enlarges a movable range of the spoke 14 when the spoke 14 is attached to the spoke attachment part 24 via the attachment opening 32, allowing the spoke 14 to be attached to the spoke attachment part 24 without removing the hub axle 26 from the bicycle hub 12. Accordingly, it is possible to improve the maintenance of the bicycle wheel assembly 10. Since the additional attachment opening 38 has substantially the same construction as that of the attachment opening 32, the additional attachment opening 38 can provide substantially the same advantageous effect.

Second Embodiment

A bicycle wheel assembly 210 in accordance with a second embodiment will be described below referring to FIGS. 16 to 18. The bicycle wheel assembly 210 has the same configuration as the bicycle wheel assembly 10 except for the additional spoke attachment part 42. Thus, elements having substantially the same function as those in the first embodiment will be numbered the same here, and will not be described and/or illustrated again in detail here for the sake of brevity.

Figure 16:
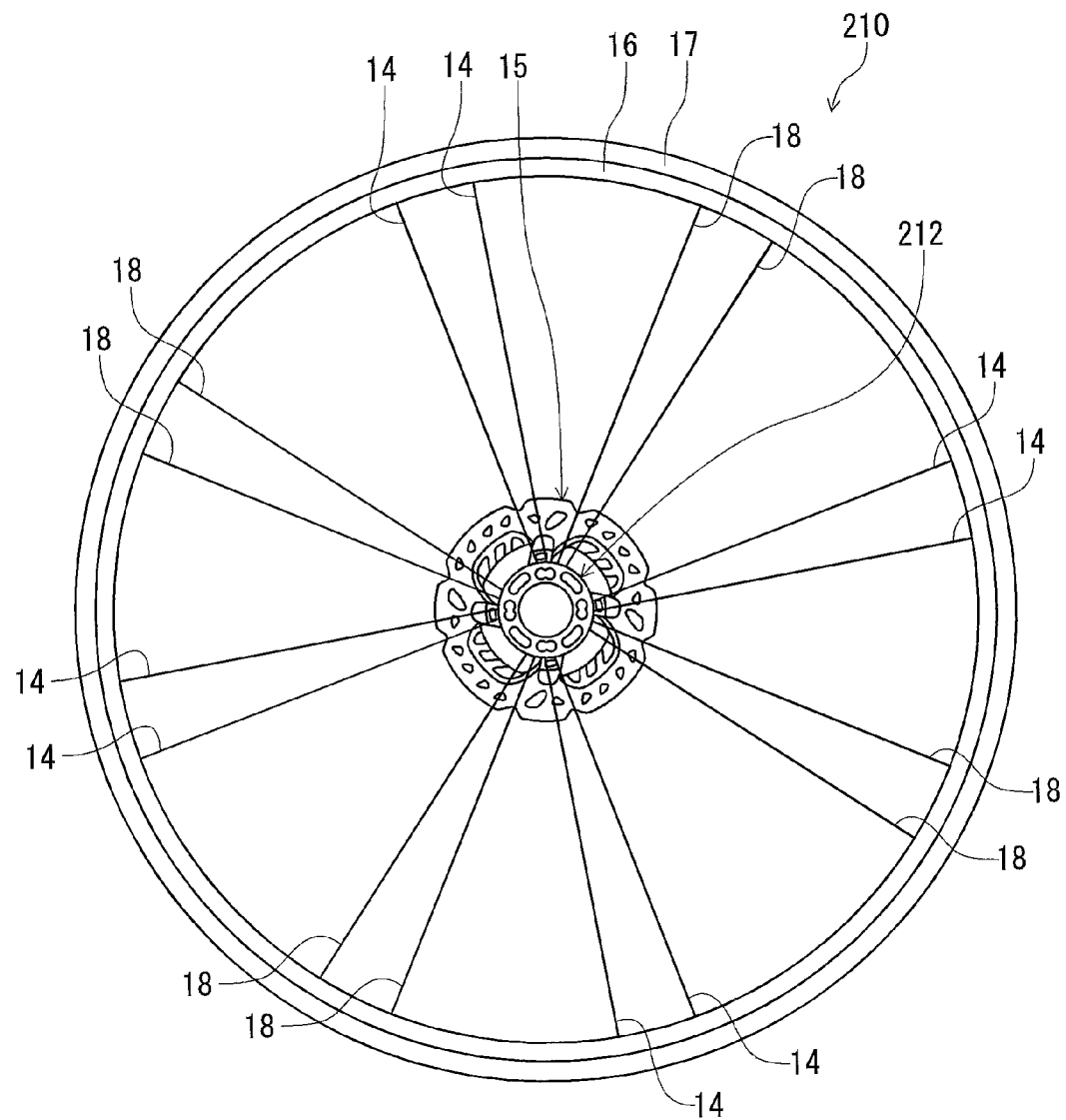
FIG. 16 is a right side elevational view of a bicycle wheel assembly in accordance with a second embodiment.

As seen in FIG. 16, the bicycle wheel assembly 210 comprises a bicycle hub 212. Unlike the bicycle wheel assembly 10 in accordance with the first embodiment, the bicycle wheel assembly 210 has the radial spoke pattern on a right side and a left side. The rim 16 is coupled to the bicycle hub 212 via the spokes 14 and the additional spokes 18.

Figure 17:
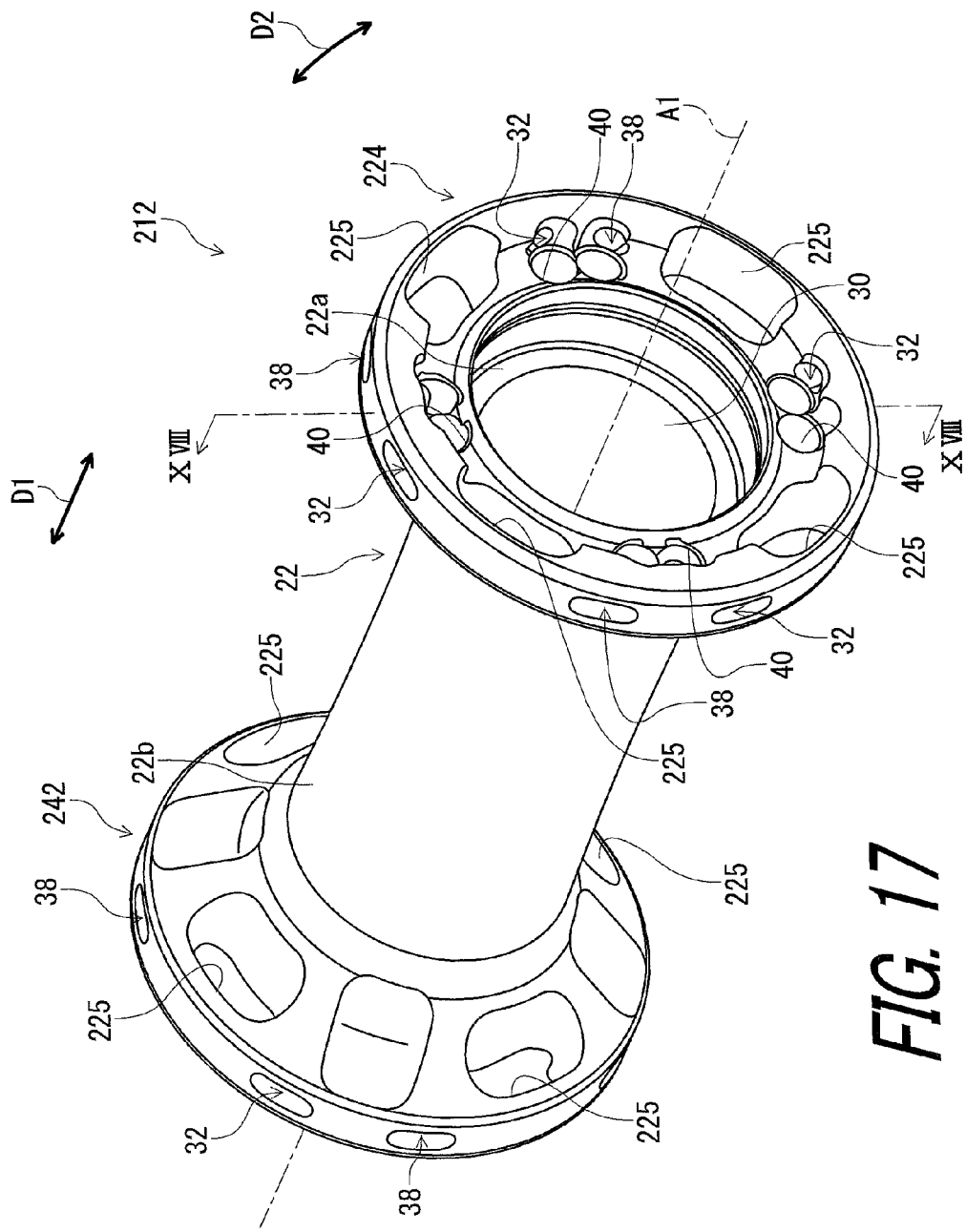
FIG. 17 is a perspective view of a bicycle hub of the bicycle wheel assembly illustrated in FIG. 16.

As seen in FIG. 17, the bicycle hub 212 comprises the tubular body 22 and a spoke attachment part 224. In the illustrated embodiment, the spoke attachment part 224 has an annular shape and is provided as a single unitary part. The spoke attachment part 224 is provided at the first axial end 22a of the tubular body 22.

Figure 18:
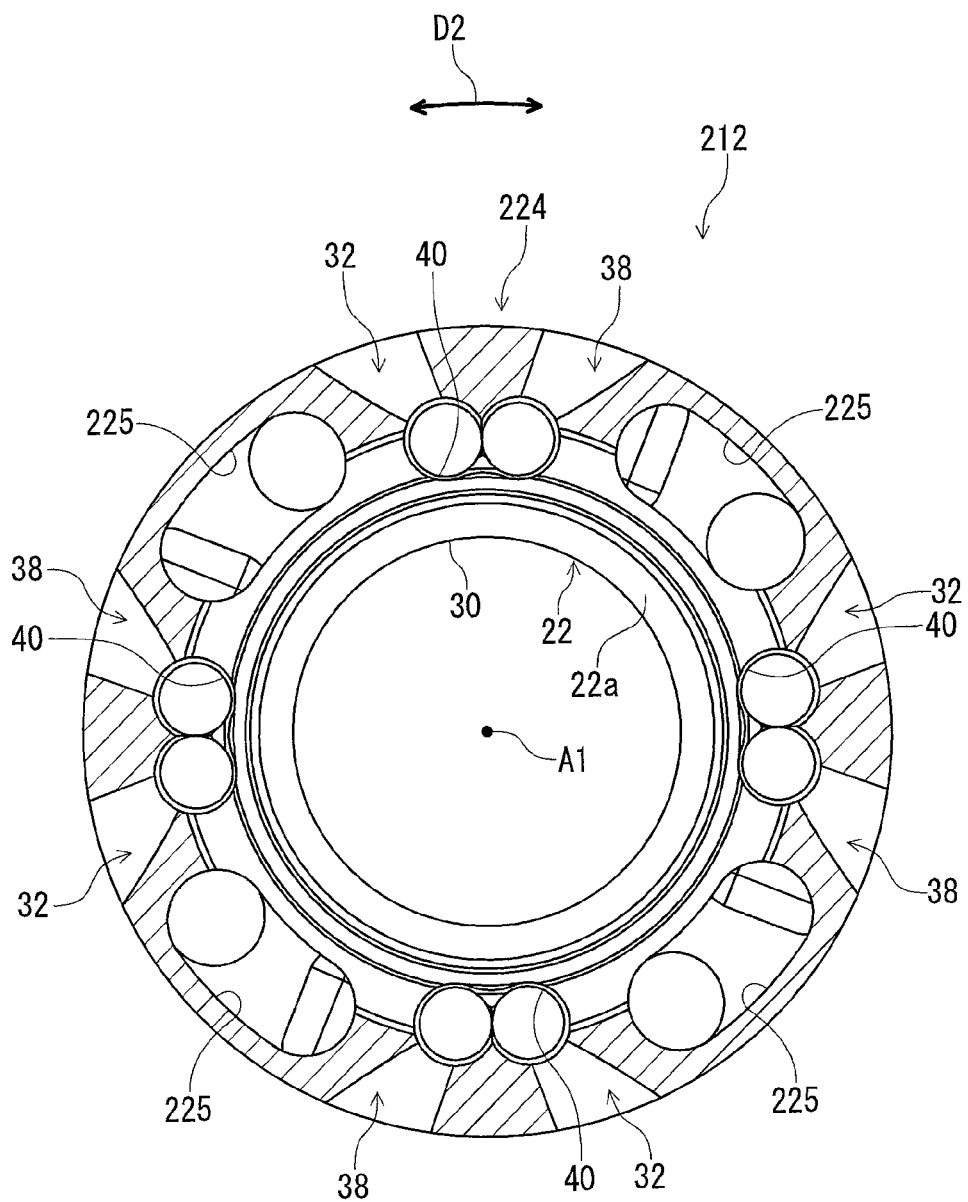
FIG. 18 is a cross-sectional view of the bicycle hub taken along line XVIII-XVIII of FIG. 17.

As seen in FIG. 18, the spoke attachment part 224 includes the attachment opening 32 and the additional attachment opening 38. In the illustrated embodiment, the spoke attachment part 224 includes the attachment openings 32 and the additional attachment openings 38. The attachment openings 32 and the additional attachment openings 38 are alternately arranged in the circumferential direction D2.

The spoke attachment part 224 extends outward from the tubular body 22 in the radial direction perpendicular to the rotational axis A1. The spoke attachment part 224 includes intermediate openings 225 spaced apart from each other in the circumferential direction D2. The intermediate openings 225 have an elongated shape extending in the circumferential direction D2. The attachment openings 32, the additional attachment openings 38, and the intermediate openings 225 are alternately arranged in the circumferential direction D2.

As seen in FIG. 17, the bicycle hub 212 comprises a spoke attachment part 242. The spoke attachment part 242 has an annular shape and is provided at the second axial end 22b of the tubular body 22. Since the spoke attachment part 242 has substantially the same construction as that of the spoke attachment part 224, it will not be described and/or illustrated in detail here for the sake of brevity.

With the bicycle hub 212, it is possible to obtain substantially the same advantageous effect as that of the bicycle hub 12 in accordance with the first embodiment. With the bicycle wheel assembly 210, it is possible to obtain substantially the same advantageous effect as that of the bicycle wheel assembly 10 in accordance with the first embodiment.

The term "comprising" and its derivatives, as used herein, are intended to be open ended terms that specify the presence of the stated features, elements, components, groups, integers, and/or steps, but do not exclude the presence of other unstated features, elements, components, groups, integers and/or steps. This concept also applies to words of similar meaning, for example, the terms "have", "include" and their derivatives.

The terms "member", "section", "portion", "part", "element", "body" and "structure" when used in the singular can have the dual meaning of a single part or a plurality of parts.

The ordinal numbers such as "first" and "second" recited in the present application are merely identifiers, but do not have any other meanings, for example, a particular order and the like. Moreover, for example, the term "first element" itself does not imply an existence of "second element", and the term "second element" itself does not imply an existence of "first element."

The term "pair of", as used herein, can encompass the configuration in which the pair of elements have different shapes or structures from each other in addition to the configuration in which the pair of elements have the same shapes or structures as each other.

Finally, terms of degree such as "substantially", "about" and "approximately" as used herein mean a reasonable amount of deviation of the modified term such that the end result is not significantly changed.

Obviously, numerous modifications and variations of the present invention are possible in light of the above teachings. It is therefore to be understood that within the scope of the appended claims, the invention may be practiced otherwise than as specifically described herein.

What is claimed is:

1. A bicycle hub comprising:
   a tubular body having a rotational axis; and
   a spoke attachment part including an attachment hole through which a spoke with an integral enlarged head is to extend, the attachment hole including
      a first end opening through which the spoke is to extend, and
      a second end opening through which the spoke is to extend, the second end opening being provided outward of the first end opening in a radial direction perpendicular to the rotational axis, the second end opening having
         a first maximum length defined on an outer peripheral surface of the spoke attachment part in a circumferential direction defined about the rotational axis, and
         a second maximum length defined on the outer peripheral surface of the spoke attachment part in an axial direction parallel to the rotational axis, the first maximum length being larger than the second maximum length.

2. The bicycle hub according to claim 1, wherein
   the spoke attachment part extends outward from the tubular body in the radial direction.

3. The bicycle hub according to claim 1, wherein
   the attachment hole extends between the first end opening and the second end opening, and
   the second end opening has a cross-sectional area larger than a cross-sectional area of the first end opening.

4. The bicycle hub according to claim 3, wherein
   a cross-sectional area of the attachment hole increases from the first end opening to the second end opening.

5. The bicycle hub according to claim 1, wherein
   the second end opening has an elongated shape extending in the circumferential direction.

6. The bicycle hub according to claim 1, wherein
   the spoke attachment part includes a cavity in which an end of the spoke is provided in an attachment state where the spoke is attached to the spoke attachment part through the attachment hole.

7. The bicycle hub according to claim 6, wherein the first end opening is connected to the cavity, and the attachment hole extends outward from the cavity along the radial direction.

8. The bicycle hub according to claim 1, wherein the spoke attachment part includes an additional attachment hole through which an additional spoke is to extend, and
the additional attachment hole includes
    a third end opening through which the additional spoke is to extend, and
    a fourth end opening through which the additional spoke is to extend, the fourth end opening having
        a third maximum length defined in the circumferential direction, and
        a fourth maximum length defined in the axial direction, the third maximum length being larger than the fourth maximum length.

9. The bicycle hub according to claim 8, wherein the additional attachment hole extends between the third end opening and the fourth end opening, and the fourth end opening has a cross-sectional area larger than a cross-sectional area of the third end opening, and the fourth end opening is provided outward of the third end opening in the radial direction.

10. The bicycle hub according to claim 9, wherein a cross-sectional area of the additional attachment hole increases from the third end opening to the fourth end opening.

11. The bicycle hub according to claim 8, wherein the fourth end opening has an elongated shape extending in the circumferential direction.

12. The bicycle hub according to claim 11, wherein the third end opening has an elongated shape extending in the circumferential direction.

13. The bicycle hub according to claim 8, wherein the spoke attachment part includes a cavity in which respective ends of the spoke and the additional spoke are provided in an attachment state where the spoke and the additional spoke are attached to the spoke attachment part through the attachment hole and the additional attachment hole.

14. The bicycle hub according to claim 13, wherein the first end opening is connected to the cavity, the attachment hole extends outward from the cavity along the radial direction, the third end opening is connected to the cavity, and the additional attachment hole extends outward from the cavity along the radial direction.

15. The bicycle hub according to claim 8, wherein the attachment hole and the additional attachment hole are arranged in the circumferential direction.

16. The bicycle hub according to claim 15, wherein the additional attachment hole is disposed at a position equal to a position of the attachment hole in the axial direction.

17. The bicycle hub according to claim 1, wherein the spoke attachment part includes a plurality of attachment portions spaced apart from each other in the circumferential direction, and the attachment hole and an additional attachment hole is respectively provided in each of the plurality of attachment portions.

18. The bicycle hub according to claim 1, further comprising:
an additional spoke attachment part, wherein
the additional spoke attachment part includes
    a first through-hole through which a first spoke is to extend, and
    a second through-hole through which a second spoke is to extend.

19. The bicycle hub according to claim 18, wherein the additional spoke attachment part extends outward from the tubular body in the radial direction.

20. The bicycle hub according to claim 19, wherein the tubular body includes a first axial end and a second axial end, the tubular body extending between the first axial end and the second axial end in the axial direction, the spoke attachment part is provided at the first axial end, and
the additional spoke attachment part is provided at the second axial end.

21. The bicycle hub according to claim 20, wherein the first through-hole and the second through-hole are arranged in the axial direction.

22. The bicycle hub according to claim 1, further comprising:
a rotor attachment part to which a disc brake rotor is to be attached.

23. A bicycle wheel assembly comprising:
the bicycle hub according to claim 22;
the spoke attached to the spoke attachment part to extend through the attachment hole; and
the disc brake rotor attached to the rotor attachment part.

24. The bicycle hub according to claim 1, wherein the first end opening has a maximum length defined in the circumferential direction, the first maximum length of the second end opening being larger than the maximum length of the first end opening.

25. The bicycle hub according to claim 1, wherein the second end opening extends entirely on the outer peripheral surface of the spoke attachment part.

26. A bicycle hub comprising:
a tubular body having a rotational axis; and
a spoke attachment part including an attachment hole through which a spoke is to extend, the attachment hole including
    a first end opening through which the spoke is to extend, and
    a second end opening through which the spoke is to extend, the second end opening being provided outward of the first end opening in a radial direction perpendicular to the rotational axis, the second end opening having
        a first maximum length defined on an exterior surface of the spoke attachment part in a circumferential direction defined about the rotational axis, and
        a second maximum length defined in an axial direction parallel to the rotational axis, the first maximum length being larger than the second maximum length, wherein
the first end opening is provided on a radially innermost portion of the attachment hole, and
the first end opening has an elongated shape extending in the circumferential direction.

27. The bicycle hub according to claim 26, wherein the second maximum length is defined on the outer peripheral surface of the spoke attachment part.

28. The bicycle hub according to claim 26, wherein the second end opening has an elongated shape extending in the circumferential direction.

29. A bicycle hub comprising:
a tubular body having a rotational axis; and
a spoke attachment part including an attachment hole through which a spoke is to extend, the attachment hole including
  a first end opening through which the spoke is to extend, and
  a second end opening through which the spoke is to extend, the second end opening being provided outward of the first end opening in a radial direction perpendicular to the rotational axis, the second end opening having
    a first maximum length defined on an outer peripheral surface of the spoke attachment part in a circumferential direction defined about the rotational axis, and
    a second maximum length defined on the outer peripheral surface of the spoke attachment part in an axial direction parallel to the rotational axis, the first maximum length being larger than the second maximum length, wherein
the first end opening has a first center axis,
the second end opening has a second center axis, and
the first center axis is offset from the second center axis in the circumferential direction.

30. A bicycle hub comprising:
a tubular body having a rotational axis; and
a spoke attachment part including an attachment hole through which a spoke is to extend, the attachment hole including
  a first end opening through which the spoke is to extend, and
  a second end opening through which the spoke is to extend, the second end opening being provided outward of the first end opening in a radial direction perpendicular to the rotational axis, the second end opening having
    a first maximum length defined on an outer peripheral surface of the spoke attachment part in a circumferential direction defined about the rotational axis, and
    a second maximum length defined on the outer peripheral surface of the spoke attachment part in an axial direction parallel to the rotational axis, the first maximum length being larger than the second maximum length, wherein
the spoke attachment part includes an additional attachment hole through which an additional spoke is to extend,
the additional attachment hole includes
  a third end opening through which the additional spoke is to extend, and
  a fourth end opening through which the additional spoke is to extend, the fourth end opening having
    a third maximum length defined in the circumferential direction, and
    a fourth maximum length defined in the axial direction, the third maximum length being larger than the fourth maximum length,
a first minimum distance is defined between the first end opening and the third end opening in the circumferential direction,
a second minimum distance is defined between the second end opening and the fourth end opening in the circumferential direction, and
the first minimum distance is shorter than the second minimum distance.

31. A bicycle hub comprising:
a tubular body having a rotational axis; and
a spoke attachment part including an attachment hole through which a spoke with an integral enlarged head is to extend, the attachment hole including
  a first end opening through which the spoke is to extend, and
  a second end opening through which the spoke is to extend, the attachment hole extending between the first end opening and the second end opening, the second end opening being provided outward of the first end opening in a radial direction perpendicular to the rotational axis, the second end opening being configured such that the spoke is pivotable relative to the spoke attachment part in a circumferential direction defined about the rotational axis in an attachment state where the spoke extends through the first end opening and the second end opening and is attached to the spoke attachment part, wherein
the first end opening is provided on a radially innermost portion of the attachment hole,
the first end opening has an elongated shape extending in the circumferential direction, and
the second end opening being configured such that an entirety of the spoke is pivotable relative to the spoke attachment part in the circumferential direction defined about the rotational axis in the attachment state.

32. The bicycle hub according to claim 31, wherein the second end opening has
  a first maximum length defined in a circumferential direction defined about the rotational axis, and
  a second maximum length defined in an axial direction parallel to the rotational axis, and
the first maximum length is larger than the second maximum length.

33. A bicycle hub comprising:
a tubular body having a rotational axis; and
a spoke attachment part including an attachment hole through which a spoke is to extend, the attachment hole including
  a first end opening through which the spoke is to extend, and
  a second end opening through which the spoke is to extend, the attachment hole extending between the first end opening and the second end opening, the second end opening being provided outward of the first end opening in a radial direction perpendicular to the rotational axis, the second end opening being configured such that the spoke is pivotable relative to the spoke attachment part in a circumferential direction defined about the rotational axis in an attachment state where the spoke extends through the first end opening and the second end opening and is attached to the spoke attachment part, wherein
the first end opening is provided on a radially innermost portion of the attachment hole,
the first end opening has an elongated shape extending in the circumferential direction, and the second end opening being configured such that an entirety of the spoke is pivotable relative to the spoke attachment part in the circumferential direction defined about the rotational axis in the attachment state, wherein the first end opening has a first center axis, the second end opening has a second center axis, and the first center axis is offset from the second center axis in the circumferential direction.

* * * * *